United States Patent
Terragno et al.

(10) Patent No.: US 9,119,415 B2
(45) Date of Patent: Sep. 1, 2015

(54) FERMENTED FOOD PRODUCTS CONTAINING PROBIOTIC STRAINS, AND THEIR PREPARATION PROCESS

(71) Applicant: COMPAGNIE GERVAIS DANONE, Paris (FR)

(72) Inventors: Luc Terragno, Meudon (FR); Francois Debru, Versailles (FR); Philippe Teissier, Palaiseau (FR); Stephane Herve, Madrid (ES); Jean-Luc Blachon, Bry-sur-Marne (FR)

(73) Assignee: COMPAGNIE GERVAIS DANONE, Paris (FR)

( * ) Notice: Subject to any disclaimer, the term of this patent is extended or adjusted under 35 U.S.C. 154(b) by 0 days.

(21) Appl. No.: 13/706,624

(22) Filed: Dec. 6, 2012

(65) Prior Publication Data

US 2013/0095208 A1  Apr. 18, 2013

Related U.S. Application Data

(60) Division of application No. 12/013,636, filed on Jan. 14, 2008, now abandoned, which is a continuation of application No. PCT/FR2006/001687, filed on Jul. 11, 2006.

(51) Int. Cl.
| | |
|---|---|
| A23C 9/12 | (2006.01) |
| A23L 1/30 | (2006.01) |
| A23C 9/123 | (2006.01) |
| A23C 11/10 | (2006.01) |
| A23L 2/02 | (2006.01) |

(52) U.S. Cl.
CPC ............. *A23L 1/3014* (2013.01); *A23C 9/1234* (2013.01); *A23C 11/106* (2013.01); *A23L 2/02* (2013.01); *A23Y 2220/00* (2013.01); *A23Y 2300/00* (2013.01); *A23Y 2300/21* (2013.01)

(58) Field of Classification Search
CPC .. A23C 9/1234; A23C 11/106; A23L 1/3014; A23Y 2300/00–2300/21; A23Y 2220/00
USPC .............. 426/7, 34, 42, 43, 580, 582, 583, 61
See application file for complete search history.

(56) References Cited

U.S. PATENT DOCUMENTS

| | | | |
|---|---|---|---|
| 4,087,559 A | 5/1978 | Mutai et al. |
| 4,091,117 A | 5/1978 | Mutai et al. |
| 4,298,619 A | 11/1981 | Mutai et al. |
| 4,913,913 A | 4/1990 | Takano et al. |
| 5,230,912 A | 7/1993 | Yajima et al. |
| 5,482,723 A | 1/1996 | Sasaki et al. |
| 7,510,735 B2 | 3/2009 | Shimakawa et al. |
| 7,579,030 B2 | 8/2009 | Domingues et al. |

FOREIGN PATENT DOCUMENTS

| | | |
|---|---|---|
| EP | 0 281 467 | 9/1998 |
| FR | 2 842 707 | 1/2004 |
| JP | 2002335860 | 11/2002 |

OTHER PUBLICATIONS

T.H. Dechter et al., "Survivability and Beta-Galactosidase Activity of Bifidobacteria Stored at Low Temperatures" Food Biotechnology, Dekker, New York NY, US, vol. 12, No. 112, 1998, pp. 73-89.
Written Opinion and International Search Report for PCT/FR2006/001687.

*Primary Examiner* — Leslie Wong
(74) *Attorney, Agent, or Firm* — Young & Thompson

(57) ABSTRACT

The invention concerns mainly a non-solid fermented food product containing ferments comprising about $5 \cdot 10^7$, in particular more than about $10^8$ *bifidobacteria* per gram of food product fermented for a shelf lifetime of at least 30 days, in particular of at least 35 days.

28 Claims, 3 Drawing Sheets

FERMENTED FOOD PRODUCTS CONTAINING PROBIOTIC STRAINS, AND THEIR PREPARATION PROCESS

This application is a divisional of U.S. Ser. No. 12/013,636, filed Jan. 14, 2008, now abandoned, which is a continuation of PCT/FR2006/001687, filed Jul. 11, 2006.

The invention relates to fermented food products containing probiotic strains, and their preparation process.

The *bifidobacteria* belong to the dominant anaerobic flora in the colon. The main species present in the human colon are *Bifidobacterium adolescentis, Bifidobacterium bifidum, Bifidobacterium longum* ssp *infantis, Bifidobacterium breve, Bifidobacterium longum.*

The *bifidobacteria* are probiotic bacteria of choice. Bacteria of the genus *Bifidobacterium* are used in numerous products currently on the market and are often added to dairy products already comprising the standard bacteria in yogurt (*Streptococcus thermophilus* and *Lactobacillus bulgaricus*).

The consumption of *bifidobacteria* is recognized as being beneficial in the process of re-establishing the normal *bifidobacteria* population in individuals having undergone antibiotics therapy. This consumption also seems to make it possible to reduce constipation, prevent diarrhoea and reduce the symptoms of lactose intolerance.

Probiotics are live bacteria. The use of these live bacteria in the manufacture of food products such as dairy products is tricky in particular with regard to the problem of survival of these bacteria in the product.

80% of the products currently on the market which contain *bifidobacteria* do not satisfy the criteria making it possible to maintain that they significantly improve the intestinal transit of the individuals consuming them. A daily intake of at least $10^8$ to $10^9$ viable cells has been recommended as the minimum dose making it possible to have a therapeutic effect (Silva A. M., Barbosa F. H., Duarte R., Vieira L. Q., Arantes R. M., Nicoli J. R., Effect of *Bifidobacterium longum* ingestion on experimental salmonellosis in mice, J. Appl. Microbiol. 97 (2004) 29-37). The required dose can be dependent on the probiotic strain used.

In the case of the production of a bioactive food product containing *bifidobacteria* the problem therefore arises of obtaining a sufficient population of these bacteria in the product and maintaining it during the "life" of the product.

The problem of the numerical size of the population of probiotic strains in a fermented dairy product is a known problem (see in particular D. Roy, Technological aspects related to the use of *bifidobacteria* in dairy products, Lait 85 (2005) 39-56, INRA, EDP Sciences).

Several reasons for this problem have been suggested, including the reduction in the population during storage, the disturbed growth of these bacteria starting from a certain pH or quite simply the poor ability of these *bifidobacteria* to grow, in particular in milk.

The main purpose of the invention is to provide non-firm fermented food products containing a high population of *bifidobacteria* throughout the period of preservation of said fermented food products, i.e. non-firm fermented food products containing *bifidobacteria* in a good physiological state and having a significant survival rate during the period of preservation of said fermented food products, in particular until the use-by date of the products.

Another purpose of the invention is to provide preparation processes which are simple to implement, making it possible to obtain the above products.

Another purpose of the invention is to promote the growth of the *bifidobacteria* over the standard symbioses present in yogurts, these symbioses being constituted in a standard fashion by one or more strains of *Streptococcus thermophilus* and of *Lactobacillus bulgaricus*.

The purposes of the invention are achieved thanks to the surprising finding made by the inventors that a precise regulation of a certain number of parameters involved in a standard fashion in the processes for the preparation of non-firm fermented food products makes it possible to obtain rapidly, after fermentation of the populations, at least $10^8$ *bifidobacteria* per gram of product, and increased survival of the *bifidobacteria* up to the use-by date of the products, without necessarily modifying the growth of the other bacterial strains.

The invention relates to a non-firm fermented food product containing ferments, which contain lactic bacteria, comprising more than approximately $5 \cdot 10^7$, in particular more than approximately $10^8$ *bifidobacteria* per gram of food product fermented for a preservation period of at least 30 days, in particular at least 35 days.

By "non-firm fermented food product" is meant a fermented food product which has undergone a stage of cutting of coagulum and/or smoothing during its preparation process prior to its packaging.

A firm fermented food product is a product which is packaged before the fermentation, the fermentation occurring in the packaging container. Thus, for a dairy product, the milk is seeded and directly packaged in pots where it ferments. After the seeding, the seeded milk is packaged in pots. These pots are generally placed in an oven for 3 hours. The bacteria reproduce and consume the lactose which is then partially converted to lactic acid which modifies the structure of the proteins, forming what is known as a lactic gel. Then, the products are placed in a ventilated cooler or cooling tunnel and stored at approximately 4° C.

Examples of non-firm fermented food products are: stirred yogurts or drinking yogurts.

By "ferments" is meant a set of bacteria, in particular bacteria intended for fermentation and/or bacteria with probiotic value.

The preservation or storage period of the fermented food product is the period which immediately follows the end of the process of preparation of the fermented food product and its packaging. During this preservation period the fermented food product is usually preserved at a temperature comprised between approximately 4 and approximately 10° C.

The abovementioned fermented food product contains more than approximately $5 \cdot 10^7$, in particular more than approximately $10^8$ *bifidobacteria* per gram of fermented food product in particular for a preservation period of at least 35 days, and more particularly for a preservation period of at least 40 days. More particularly the abovementioned fermented food product contains more than approximately $5 \cdot 10^7$, in particular more than approximately $10^8$ *bifidobacteria* per gram of fermented food product up to the use-by date of the product.

The use-by dates depend on the legal preservation periods fixed by current legislation, which can typically vary from 15 to 50 days from the date of production. By way of example, the legal preservation period is generally 30 days for fresh dairy products.

A population of *bifidobacteria* which is greater than or equal to $10^8$ CFU/g at the use-by date of product preserved between 4 and 10° C. can be considered as a sufficient population of *bifidobacteria* given the medical recommendations relating to the provision of *bifidobacteria* in food.

The invention relates more particularly to the fermented food product as defined above, in which the ratio of the number of *bifidobacteria* contained in the fermented food product at the end of the preservation period to the number of *bifidobacteria* contained in the fermented food product at the start of the preservation period of at least 30 days, in particular at least 35 days, is approximately 0.2 to approximately 0.8, in particular approximately 0.3 to approximately 0.7, in particular approximately 0.4 to approximately 0.5.

In other words the survival rate of the *bifidobacteria* contained in the fermented food product between the start of the preservation period (i.e. the end of the preparation process) and the end of the preservation period is comprised between 20 and 80%, in particular between 30 and 70%, and in particular between 40 and 50%.

Said preservation period is at least 30 days, in particular at least 35 days, but more particularly at least 40 days or extends up to the use-by date of the fermented food product.

The invention also relates to a non-firm fermented food product preserved for a preservation period of at least 30 days, in particular at least 35 days, at a temperature of approximately 4 to approximately 10° C., containing ferments comprising more than approximately $10^8$ *bifidobacteria* per gram of fermented food product.

More particularly the invention relates to a non-firm fermented food product preserved for a preservation period of at least 30 days, in particular at least 35 days, in particular at least 40 days, at a temperature of less than 12° C. or less than 10° C., containing ferments comprising more than approximately $5 \cdot 10^7$, in particular more than approximately $10^8$ *bifidobacteria* per gram of fermented food product.

The invention relates more particularly to a fermented food product as defined above, containing more than approximately $5 \cdot 10^7$, in particular more than approximately $10^8$ *bifidobacteria* per gram of fermented food product at the start of the preservation period.

Fermented food product according to one of claims 1 to 4, in which the *bifidobacteria* contained in the fermented food product are of the type *Bifidobacterium animalis*, in particular *Bifidobacterium animalis animalis* and/or *Bidifobacterium animalis lactis*, and/or *Bifidobacterium breve* and/or *Bifidobacterium longum* and/or *Bidifobacterium infantis* and/or *Bidifobacterium bifidum*.

Advantageously, the fermented food product as defined above is prepared based on plant juice and in particular fruit juice or vegetable juice such as soya juice, or on a dairy product, and in particular on cow's milk and/or on goat's milk.

Said fermented food product can also be based on sheep's milk or on camel's milk or mare's milk.

By plant juice is meant a juice produced from plant extracts, in particular soya, tonyu, oat, wheat, maize etc.

Examples of vegetable juice are: tomato juice, beet juice, carrot juice etc.

Examples of fruit juice are: apple, orange, strawberry, peach, apricot, plum, raspberry, blackberry, gooseberry, pineapple, lemon, citrus fruit, grapefruit, banana, kiwi fruit, pear, cherry, passion fruit, mango, exotic fruit juice, multifruit juice etc.

According to an advantageous embodiment, the fermented food product as defined above is such that the ferments contain lactic bacteria, in particular one or more bacteria of the genus *Lactobacillus* spp. and in particular *Lactobacillus delbrueckii bulgaricus* and/or *Lactobacillus casei* and/or *Lactobacillus reuteri* and/or *Lactobacillus acidophilus* and/or *Lactobacillus helveticus* and/or *Lactobacillus plantarum*, and/or bacteria of the type *Lactococcus cremoris* and/or *Streptococcus thermophilus* and/or *Lactococcus lactis* and/or one or more bacteria of the genus *Leuconostoc*.

According to an advantageous embodiment, the fermented food product as defined above is such that the ferments contain lactic bacteria which exhibit a symbiotic phenomenon between themselves.

By "symbiotic phenomenon" is meant a relation between different types of lactic bacteria which are capable of creating a mutual assistance between themselves and increasing their fermentation activities.

According to an advantageous embodiment, the proportion of *bifidobacteria* in the ferments contained in the fermented food product as defined above is approximately 20 to approximately 80%, in particular approximately 30 to approximately 70%, in particular approximately 40 to approximately 60%, and in particular approximately 50%.

By "proportion of *bifidobacteria* in the ferments" is meant the proportion of *bifidobacteria* relative to the total number of bacteria included in the fermented food product, i.e. relative to all of the *bifidobacteria* and other bacteria, in particular the bacteria *Lactococcus, Lactobacillus, Streptococcus* etc.

The good numerical balance between the *bifidobacteria* and the other bacterial strains in the fermented food product at the end of the preparation process, and the substantial maintenance of this balance throughout the preservation period, are essential guarantees of the quality of the food product.

A proportion of 50% *bifidobacteria* constitutes a good compromise between the problem of cost (the *bifidobacteria* are expensive) and the problem of obtaining a correct population of *bifidobacteria*.

According to a particular embodiment, the fermented food product according to the invention is presented in the form of a stirred fermented food product or a fermented food product for drinking or an infant fermented food product.

By "stirred [ . . . ] product" is meant a product, in particular a milk, seeded, fermented, mechanically stirred then packaged. The fermentation of such a product is carried out not in a pot but in bulk, in tanks. The curd is stirred then cooled down before being packed in pots, which are stored under refrigeration. By curd is meant a coagulate of proteins in particular of milk.

By "[ . . . ] product for drinking" is meant a product in substantially liquid form. A product for drinking is a product which is such that, after the mechanical stirring stage, the product is beaten in the tanks before being packaged.

By "infant [ . . . ] product" is meant a product suited to an infant's needs, with a low protein and fat content.

Said fermented food product can in particular be a yogurt or a firm, stirred or drinking yogurt or a bar containing a dairy substance, kefir, a biscuit with a dairy filling, a water containing probiotics etc.

Moreover the invention also relates to a process for the preparation of a fermented food product from a starting substance, comprising the following successive stages:

a stage of seeding of a starting substance, optionally pasteurized, by inoculation with seeding ferments containing approximately $4 \cdot 10^6$ to approximately $1 \cdot 10^7$ *bifidobacteria* per ml of starting substance, in order to obtain a seeded substance, a stage of fermentation of the seeded substance obtained in the preceding stage, such that the temperature at the start of fermentation is approximately 36 to approximately 38° C., the temperature at the end of fermentation is approximately 37 to approximately 39° C., and the fermentation time is approximately 8 to approximately 11 hours, in order to obtain a fermented substance, a stage of intermediate cooling of the fermented substance obtained in the preceding stage, such that the intermediate cooling time is approximately 1 hour 30 minutes to approximately 2 hours and the intermediate cooling temperature is approximately 4 to approximately 18° C., in order to obtain a pre-cooled substance, a stage of storage of the pre-cooled substance obtained in the preceding stage, such that the storage time is less than approximately 15 hours, in order to obtain a stored substance, a stage of final cooling of the stored substance obtained in the preceding stage, such that the temperature at the start of the final cooling is less than approximately 21° C. and the temperature at the end of the final cooling is approximately 2 to approximately 6° C., so as to obtain a fermented food product.

The ferments used for seeding the starting substance are generally obtained by growing *bifidobacteria* in a culture medium and under conditions such that when the population of *bifidobacteria* arrives at confluence, it contains $10^8$ to $10^9$ *bifidobacteria* per ml of culture medium. It is therefore noted that according to the invention the quantity of ferments used at the start corresponds to approximately 0.1% of the dose of *bifidobacteria* used in a standard fashion.

By "fermentation" is meant a biochemical reaction which involves releasing energy from an organic substrate, under the action of micro-organisms. It is a process of conversion of a raw material by the micro-organisms, this conversion then producing biomass and metabolites. In particular, lactic fermentation is an anaerobic process of the consumption of lactose by the bacteria in the ferments, which causes the formation of lactic acid and a lowering of the pH.

The invention follows from the surprising finding made by the inventors that the regulation of the parameters of time, temperature and initial population of *bifidobacteria* within the abovementioned ranges, makes it possible to improve the resistance of the *bifidobacteria* and their ability to survive. The bidifobacteria contained in the fermented food product at the end of the preparation process of the invention are in a better physiological state than if said parameters are fixed at values situated outside the above ranges, which allows a greater number of these *bifidobacteria* to survive during the preservation of the fermented food product which follows.

Moreover, the regulation of said parameters within the abovementioned ranges allows substantial savings, in particular, in time and energy.

Moving away from the ranges fixed according to the invention, the survival rate of the *bifidobacteria* during preservation is unfavourably altered.

The abovementioned preparation process makes it possible to obtain non-firm fermented food products.

Advantageously, the ferments contain lactic bacteria.

According to a particular embodiment, the process for the preparation of a fermented food product according to the invention is such that the *bifidobacteria* are chosen from bacteria of the type *Bifidobacterium animalis*, in particular *Bifidobacterium animalis animalis* and/or *Bidifobacterium animalis lactis*, and/or *Bifidobacterium breve* and/or *Bifidobacterium longum* and/or *Bifidobacterium infantis* and/or *Bifidobacterium bifidum*.

According to a particular embodiment, the process for the preparation of a fermented food product according to the invention is such that the *bifidobacteria* are chosen from bacteria of the type *Bifidobacterium animalis*.

Advantageously, the intermediate cooling time in the process for the preparation of a fermented food product according to the invention is approximately 1 hour 30 minutes.

Advantageously, the storage time in the process for preparation of a fermented food product according to the invention is less than or equal to approximately 12 hours, in particular equal to approximately 12 hours.

Advantageously, the temperature at the end of final cooling in the process for the preparation of a fermented food product according to the invention is approximately 4° C.

According to a particular embodiment of the process for the preparation of a food product as defined above, the seeding ferments contain lactic bacteria, in particular one or more bacteria of the genus *Lactobacillus* spp. and in particular *Lactobacillus delbrueckii bulgaricus* and/or *Lactobacillus casei* and/or *Lactobacillus reuteri* and/or *Lactobacillus acidophilus* and/or *Lactobacillus helveticus* and/or *Lactobacillus plantarum*, and/or bacteria of the type *Lactococcus cremoris* and/or *Streptococcus thermophilus* and/or *Lactococcus lactis* and/or one or more bacteria of the genus *Leuconostoc*.

Advantageously, the lactic bacteria exhibit a symbiotic phenomenon between themselves.

According to a particular embodiment of the process for the preparation of a food product as defined above, the proportion of *bifidobacteria* in the seeding ferments is approximately 20 to approximately 75%, in particular approximately 30 to approximately 50%, in particular approximately 35 to approximately 40%, in particular approximately 37.5%.

By "proportion of the *bifidobacteria* in the seeding ferments", is meant the proportion of the *bifidobacteria* relative to all of the inoculated bacteria in total during the seeding stage.

This proportion corresponds to an optimum in terms of cost and final concentration of *bifidobacteria*, given that the higher the concentration of *bifidobacteria* at the start, the more competitive they are in terms of growth relative to the other strains in the ferments, and the more rapidly the optimum concentration of *bifidobacteria* is reached.

According to a particular embodiment of the process for the preparation of a food product as defined above, the starting substance is based on plant juice and in particular fruit juice or vegetable juice such as soya juice, or on a dairy product, constituted in particular by cow's milk and/or goat's milk.

The starting substance can also comprise sheep's and/or camel's and/or mare's milk.

In the case where the fermented food product is a dairy product, the starting substance can comprise milk, milk powder, sugar, a mixture of milk and plant juice, a mixture of milk and fruit juice, a mixture of milk and starch.

According to a particular embodiment, the process for the preparation of a fermented food product according to the invention comprises an additional stage of stirring between the fermentation stage and the intermediate cooling stage, making it possible to obtain, from the fermented substance obtained in the fermentation stage, a stirred fermented substance.

By "stirring" is meant a process of mechanical stirring using a turbine or helical stirrer. It is a stage which determines the oiliness of the product in particular the dairy product. If the stirring is too violent, incorporation of air and separation of the serum can occur. If the stirring is insufficient, the product risks subsequently becoming too thick.

According to a particular embodiment, the process for the preparation of a fermented food product according to the invention comprises a pasteurization stage before the seeding stage, making it possible to obtain, from the starting substance, a pasteurized starting substance.

By "pasteurization" is meant the method usual in the field of food preservation involving a rapid heating without boiling, followed by rapid cooling, making it possible to destroy most of the bacteria while partially preserving the proteins.

According to an advantageous embodiment of the process for the preparation of a fermented food product according to the invention, the pasteurized starting substance is a pasteurized starting substance, which is held, optionally homogenized, and cooled down, obtained from a raw material, said process comprising, before the seeding stage, the following successive stages:
- a stage of standardization of fatty substances of the raw material so as to obtain a standardized substance,
- a stage of enrichment with dried matter of the standardized substance obtained in the preceding stage, so as to obtain an enriched substance,
- a stage of pre-heating of the enriched substance obtained in the preceding stage, so as to obtain a starting substance,
- a stage of pasteurization and holding of the starting substance obtained in the preceding stage, so as to obtain a pasteurized and held substance,
- an optional stage of homogenization of the pasteurized and held substance obtained in the preceding stage, so as to obtain a pasteurized, held and optionally homogenized substance,
- a stage of initial cooling of the pasteurized, held and optionally homogenized substance obtained in the preceding stage, so as to obtain a pasteurized starting substance, held, optionally homogenized, and cooled down.

By "standardization of fatty substances" is meant a stage of bringing the quantity of fats present in the starting substance to a pre-determined level.

Enrichment with dried matter involves the addition of proteins and fatty substance in order to modify the firmness of the curd.

"Holding" involves a rapid thermization of the milk and makes it possible to destroy the vegetative microbial flora, including pathogenic forms. Its typical duration is from 4 to 10 minutes, in particular from 5 to 8 minutes, and in particular approximately 6 minutes.

By "homogenization" is meant the dispersion of the fatty substances in the milk-type substance into small fat globules. The homogenization is carried out for example at a pressure of 100 to 280 bars, in particular 100 to 250 bars, in particular 100 to 200 bars, in particular approximately 200 bars. This homogenization stage is purely optional. It is in particular absent from the production process of products with 0% fatty substances.

According to an advantageous embodiment, the process for the preparation of a fermented food product according to the invention comprises, after the final cooling stage, a stage of preservation of the fermented food product at a temperature comprised between approximately 4 and approximately 10° C.

According to an advantageous embodiment, the process for the preparation of a fermented food product according to the invention comprises a stage of the addition of an intermediate preparation simultaneously with the seeding stage or between the seeding stage and the fermentation stage, so as to obtain, from the seeded substance, a completed seeded substance, or after the fermentation stage, so as to obtain, from the fermented substance, a completed fermented substance, said intermediate preparation comprising a preparation of fruits and/or cereals and/or additives such as flavourings and colourings.

The intermediate preparation can in particular contain thickeners (soluble and insoluble fibres, alginates, carragheenans, xanthan gum, pectin, starch, in particular gelatinized, gelan gum, cellulose and its derivatives, guar and carob gum, inulin) or sweeteners (aspartame, acesulphame K, saccharine, sucralose, cyclamate) or preservatives.

Examples of flavourings are: apple, orange, strawberry, kiwi fruit, cocoa flavouring etc.

Examples of colourings are: beta-carotene, carmine, cochineal red.

Moreover, the preparation of the abovementioned fruits can comprise fruits which are whole or in pieces or in jelly or in jam, making it possible for example to obtain fruit yogurts.

The intermediate preparation can also contain plant extracts (soya, rice etc.).

The invention also relates to a fermented food product as obtained from one of the processes as defined above.

EXAMPLE 1

In order to prove that the ranges of the different parameters as defined above correspond to an optimization vis-à-vis the survival of the *bifidobacteria* during preservation, a standard stirred yogurt is prepared varying each factor independently. Each factor is tested at a low level (marked −1), a medium level (marked 0) and a high level (marked +1). The list of the parameters tested is shown in Table 1 below:

TABLE 1

| Factors | | Low level (−1) | Medium level (0) | High level (+1) |
|---|---|---|---|---|
| Growth of the bifidobacteria | Inoculation of bifidobacteria | $10^6$ CFU/ml | $10^7$ CFU/ml | $5.10^7$ CFU/ml |
| | Fermentation time | 6.5 h | 8.25 h | 10 h |
| | Fermentation temperature | 36° C. | 38° C. | 40° C. |
| Survival of the bifidobacteria | Waiting time for smoothing at the end of the fermentation | 0.33 h | 1 h | 2.5 h |
| | Cooling temperature (smoothing) | 15° C. | 17.5° C. | 20° C. |
| | Buffer storage time after smoothing | 1 h | 12 h | 20 h |
| | Packaging temperature | 15° C. | 17.5° C. | 20° C. |
| | Cooling and product-storage temperature | 4° C. | 7° C. | 10° C. |

Figure 1:
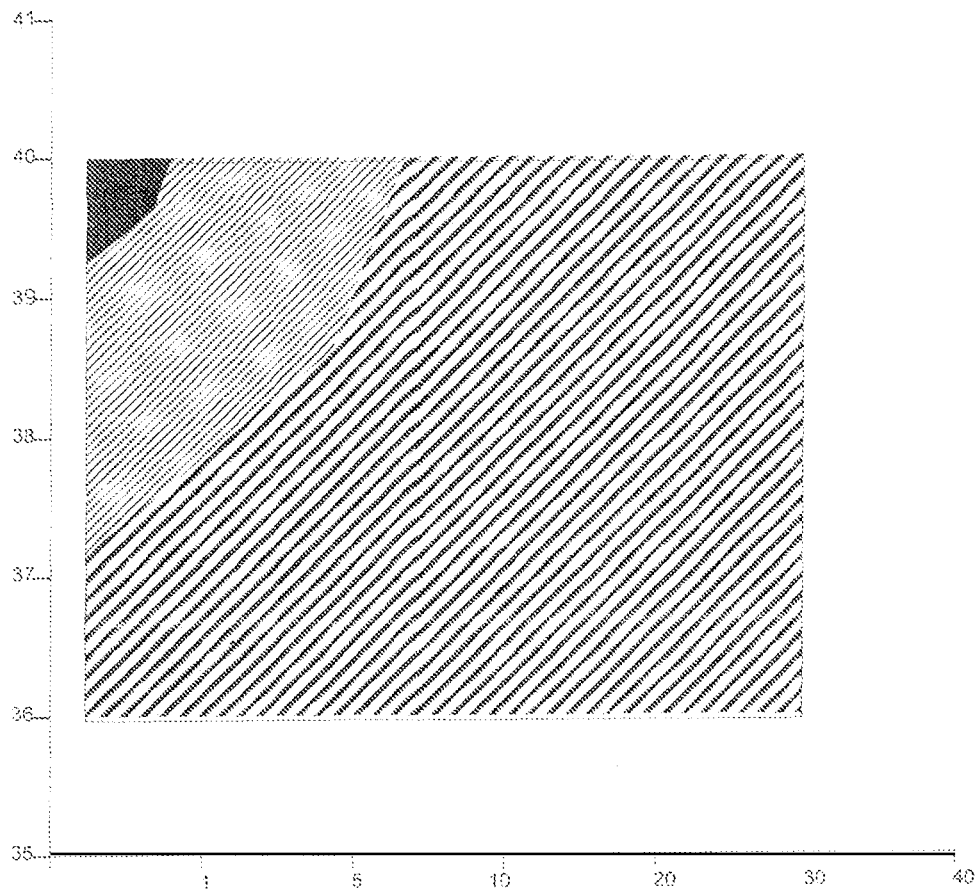
FIG. 1 represents the tolerance chart corresponding to the effect of the fermentation temperature as a function of the quantity of *bifidobacteria* at the start. x-axis: quantity of *bifidobacteria* inoculated at $10^7$ CFU/ml; y-axis: fermentation temperature in degrees celsius. Black: quantity of *bifidobacteria* less than $5 \cdot 10^7$ CFU/ml; fine hatching: quantity of *bifidobacteria* comprised between $5 \cdot 10^7$ and $10^8$ CFU/ml; thick hatching: quantity of *bifidobacteria* greater than $10^8$ CFU/ml. The measurement is carried out at the end of fermentation.
Figure 2:
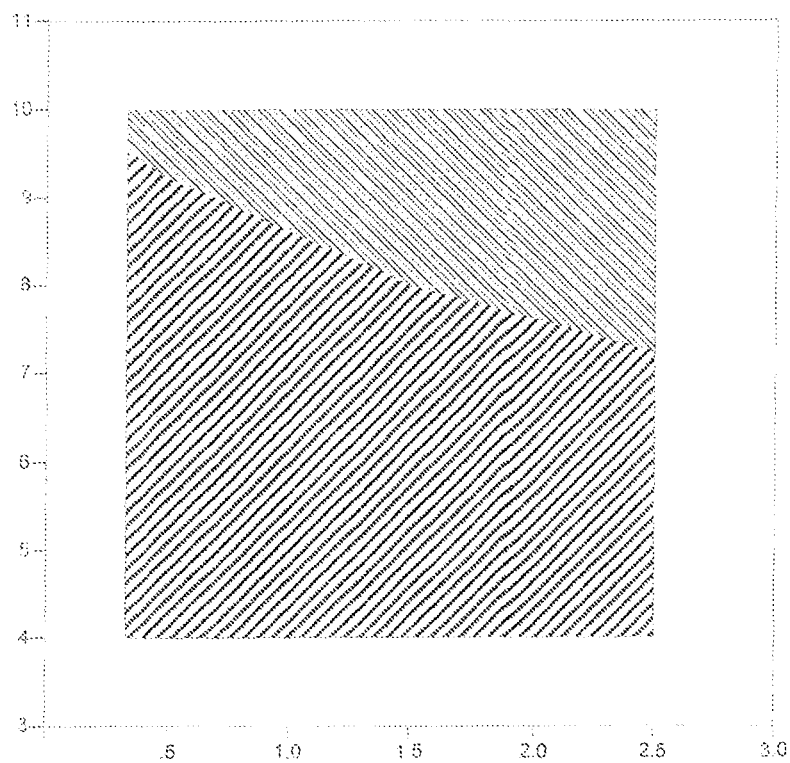
FIG. 2 represents the tolerance chart corresponding to the effect of the cooling temperature of the products before the final storage at 10° C. as a function of the waiting time before cooling to 20° C. x-axis: waiting time for smoothing (in hours); y-axis: cooling temperature before final storage (in ° C.). Fine hatching: quantity of *bifidobacteria* comprised between $5 \cdot 10^7$ and $10^8$ CFU/ml; thick hatching: quantity of *bifidobacteria* greater than $10^8$ CFU/ml. The measurement is carried out 35 days after fermentation.
Figure 3:
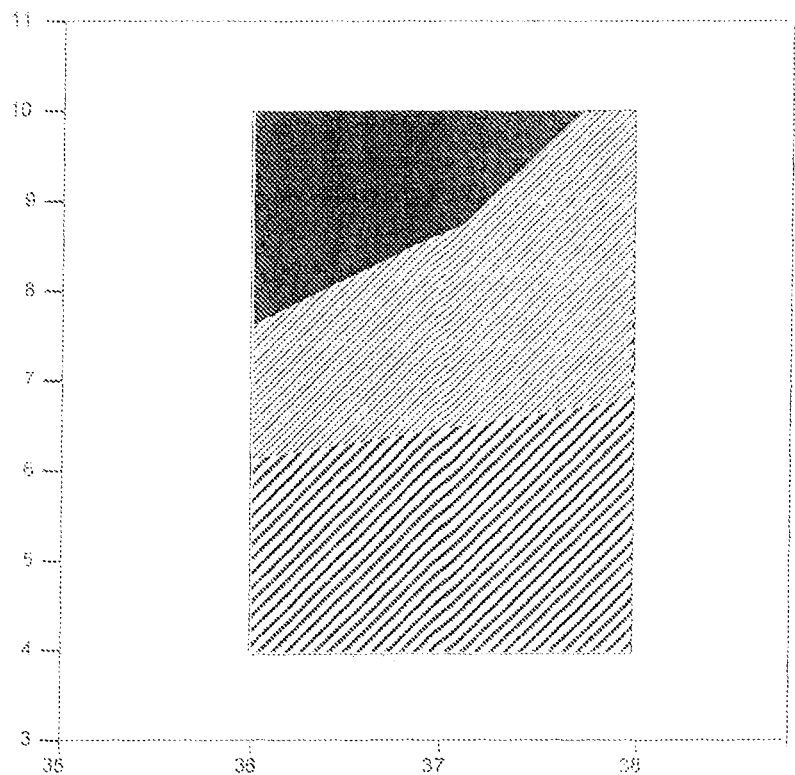
FIG. 3 represents the tolerance chart corresponding to the effect of the cooling temperature of the products before final storage at 10° C. as a function of the fermentation temperature. x-axis: fermentation temperature (° C.); y-axis: cooling temperature during final storage (° C.). Black: quantity of *bifidobacteria* less than $5 \cdot 10^7$ CFU/ml; fine hatching: quantity of *bifidobacteria* comprised between $5 \cdot 10^7$ and $10^8$ CFU/ml; thick hatching: quantity of *bifidobacteria* greater than $10^8$ CFU/ml. The measurement is carried out 35 days after the fermentation.

From the different experiments, the factors are correlated and tolerance charts are established vis-à-vis the growth and survival of the *bifidobacteria*, which correspond to the projections of the quantities of *bifidobacteria* obtained for each parameter: see FIGS. 1 to 3.

In particular in FIG. 2 it is noted that if the products are not cooled sufficiently rapidly (too long a waiting time in fermentation tank), there is a loss of *bifidobacteria*. In FIG. 3 it is noted that if the products are not cooled correctly between 4° C. and 6° C., the loss in *bifidobacteria* at D+35 is significant.

EXAMPLE 2

Industrial tests are carried out on 3000 liters.

1$^{st}$ group of tests:

Control 1: fermentation temperature 39° C.; storage time 24 h.

Control 2: fermentation temperature 40° C.

Test 1: fermentation temperature 37° C., cooling 6° C.

(control 1 and control 2: milk+milk powder)

2$^{nd}$ group of tests:

Control 3: fermentation temperature 39° C.

Control 4: fermentation temperature 40° C.

Test 2: all the parameters are chosen from the claimed ranges, i.e.:

inoculation of *bifidobacteria*: 1·10$^7$ CFU/ml;
fermentation time: 9 h 40;
fermentation temperature: 37° C.;
intermediate cooling time: 1 h 30;
intermediate cooling temperature: 18° C.;
buffer storage time after smoothing: 12 h;
final cooling temperature: 6° C.

(control 3 and control 4: milk+milk powder+fruit preparation added at the end of production)

The results are presented in Tables 2 and 3 below, where the population of *bifidobacteria* is indicated in CFU/ml.

TABLE 2

| | End of fermentation | D + 1 | D + 21 | D + 35 |
|---|---|---|---|---|
| Control 1 | $1.0 \cdot 10^8$ | $1.0 \cdot 10^8$ | $5.0 \cdot 10^7$ | $3.0 \cdot 10^7$ |
| Control 2 | $3.0 \cdot 10^7$ | $6.0 \cdot 10^7$ | $3.0 \cdot 10^7$ | $3.0 \cdot 10^7$ |
| Test 1 | $1.7 \cdot 10^8$ | $1.7 \cdot 10^8$ | $2.0 \cdot 10^8$ | $1.4 \cdot 10^8$ |

TABLE 3

| | End of fermentation | D + 1 | D + 35 |
|---|---|---|---|
| Control 3 | $1.9 \cdot 10^8$ | $1.5 \cdot 10^8$ | $7.0 \cdot 10^7$ |
| Control 4 | $2.0 \cdot 10^7$ | $2.0 \cdot 10^7$ | $2.0 \cdot 10^7$ |
| Test 2 | $5.0 \cdot 10^8$ | $3.8 \cdot 10^8$ | $2.1 \cdot 10^8$ |

In these tables, D corresponds to the end of fermentation, D+1 corresponds to storage for 1 day etc.

The invention claimed is:

1. A process for the preparation of a fermented food product from a starting substance based on cow's milk, comprising the following successive stages:

a stage of seeding of the starting substance by inoculation with seeding ferments containing $4 \times 10^6$ to $1 \times 10^7$ *Bifidobacteria animalis* per ml of the starting substance, in order to obtain a seeded substance, a stage of fermentation of the seeded substance obtained in the preceding stage, such that the temperature at the start of fermentation is 36 to 38° C., the temperature at the end of fermentation is 37 to 39° C., and the fermentation time is 8 to 11 hours, in order to obtain a fermented substance, a stage of intermediate cooling of the fermented substance obtained in the preceding stage, such that the intermediate cooling time is 0.33 hour to 2.5 hours and the intermediate cooling temperature is from 15° C. to 20° C. in order to obtain a pre-cooled substance, a stage of storage of the pre-cooled substance obtained in the preceding stage, such that the storage time is less than 15 hours, in order to obtain a stored substance, and a stage of final cooling of the stored substance obtained in the preceding stage, such that the temperature at the start of the final cooling is less than 21° C. and the temperature at the end of the final cooling is 2 to 6° C., so as to obtain a fermented food product.

2. The process for the preparation of a fermented food product according to claim 1, wherein the *Bifidobacterium animalis* is selected from the group consisting of *Bifidobacterium animalis animalis, Bidifobacterium animalis lactis*, and combinations thereof.

3. The process for the preparation of a fermented food product according to claim 1, wherein the intermediate cooling time is 1 h 30.

4. The process for the preparation of a fermented food product according to claim 1, wherein the storage time is less than or equal to 12 hours.

5. The process according to claim 1, wherein the temperature at the end of final cooling is 4° C.

6. The process for the preparation of a fermented food product according to claim 1, wherein the seeding ferments contain lactic bacteria, such as one or more bacteria of the genus *Lactobacillus* spp.

7. The process for the preparation of a fermented food product according to claim 6, wherein the bacteria of the genus *Lactobacillus* spp. are selected from the group consisting of *Lactobacillus delbrueckii bulgaricus*, *Lactobacillus casei*, *Lactobacillus reuteri*, *Lactobacillus acidophilus*, *Lactobacillus helveticus*, *Lactobacillus plantarum*, bacteria of the type *Lactococcus cremoris*, *Streptococcus thermophiles*, *Lactococcus lactis*, one or more bacteria of the genus *Leuconostoc*, and combinations thereof.

8. The process for the preparation of a fermented food product according to claim 1, wherein the proportion of *Bifidobacteria animalis* in the seeding ferments is 20 to 75%.

9. The process for the preparation of a fermented food product according to claim 1, wherein the fermented food product is a stirred fermented food product, and wherein the process further comprises an additional stirring stage between the fermentation stage and the intermediate cooling stage.

10. The process for the preparation of a fermented food product according to claim 1, further comprising a pasteurization stage before the seeding stage.

11. The process for the preparation of a fermented food product according to claim 9, wherein the pasteurized starting substance is a pasteurized starting substance which is held and cooled down, obtained from a raw material, said process comprising, before the seeding stage, the following successive stages:
   a stage of standardization of fatty substance of the raw material so as to obtain a standardized substance,
   a stage of enrichment with dried matter of the standardized substance obtained in the preceding stage, so as to obtain an enriched substance,
   a stage of pre-heating of the enriched substance obtained in the preceding stage, so as to obtain a starting substance,
   a stage of pasteurization and holding of the starting substance obtained in the preceding stage, so as to obtain a pasteurized and held substance,
   a stage of initial cooling of the pasteurized, held and optionally homogenized substance obtained in the preceding stage, so as to obtain a pasteurized starting substance, held and cooled down.

12. The process for the preparation of a fermented food product according to claim 1 further comprising, after the final cooling stage, a stage of preservation of the fermented food product at a temperature comprised between 4 and 10° C.

13. The process for the preparation of a fermented food product according to claim 1, further comprising a stage of the addition of an intermediate preparation simultaneously with the seeding stage or between the seeding stage and the fermentation stage, so as to obtain, from the seeded substance, a completed seeded substance, or after the fermentation stage, so as to obtain, from the fermented substance, a completed fermented substance, said intermediate preparation comprising a preparation of fruits and/or cereals and/or additives such as flavourings and colourings.

14. The process according to claim 1, wherein the product is a non-firm product comprising more than $5 \times 10^7$, *Bifidobacteria animalis* per gram of fermented food product for a preservation period of at least 30 days.

15. The process according to claim 14, wherein the product comprises more than $10^8$ *Bifidobacteria animalis* per gram of fermented food product for a preservation period of at least 30 days.

16. The process according to claim 14 wherein the product has a ratio of the number of *Bifidobacteria animalis* contained in the fermented food product at the end of the preservation period to the number of *Bifidobacteria animalis* contained in the fermented food product at the start of the preservation period of at least 30 days, is 0.2 to 0.8.

17. The process according to claim 14, wherein the product has a ratio of the number of *Bifidobacteria animalis* contained in the fermented food product at the end of the preservation period to the number of *Bifidobacteria animalis* contained in the fermented food product at the start of the preservation period of at least 30 days, is 0.3 to 0.7.

18. The process according to claim 14, wherein the product has a ratio of the number of *Bifidobacteria animalis* contained in the fermented food product at the end of the preservation period to the number of *Bifidobacteria animalis* contained in the fermented food product at the start of the preservation period of at least 30 days, is 0.4 to 0.5.

19. The process according to claim 14, wherein the product contains more than $5 \times 10^7$, *Bifidobacteria animalis* per gram of fermented food product at the start of the preservation period.

20. The process according to claim 1, wherein the product is a non-firm product, and wherein the ferments contain lactic bacteria which exhibit a symbiotic phenomenon between themselves.

21. The process according to claim 1, wherein the product is a non-firm product, and wherein the proportion of *Bifidobacteria animalis* in the ferments is 20 to 80%.

22. The process according to claim 1, wherein the product is a non-firm product, and wherein the proportion of *Bifidobacteria animalis* in the ferments 30 to 70%.

23. The process according to claim 1, wherein the product is a non-firm product, and wherein the proportion of *Bifidobacteria animalis* in the ferments is 40 to 60%.

24. The process according to claim 1, wherein the product is a non-firm product, and wherein the proportion of *Bifidobacteria animalis* in the ferments is 50%.

25. The process according to claim 1, wherein the product is a non-firm product, and wherein the product is presented in the form of a stirred fermented food product or a fermented food product for drinking or an infant fermented food product.

26. The process according to claim 1, wherein the starting substance is pasteurized.

27. The process of claim 11, further comprising a stage of homogenization of the pasteurized and held substance.

28. The process of claim 1, wherein the intermediate cooling temperature is 18° C.

* * * * *